United States Patent
Cheng et al.

(10) Patent No.: US 11,283,507 B2
(45) Date of Patent: Mar. 22, 2022

(54) TRANSMITTER BEAMFORMING AT BASE STATION WITH PARTIAL CHANNEL INFORMATION AND UE FEEDBACK

(71) Applicant: Samsung Electronics Co., Ltd., Suwon-si (KR)

(72) Inventors: Hongbing Cheng, San Diego, CA (US); Federico Penna, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/020,562

(22) Filed: Sep. 14, 2020

(65) Prior Publication Data

US 2022/0029684 A1    Jan. 27, 2022

Related U.S. Application Data (60) Provisional application No. 63/055,507, filed on Jul. 23, 2020.

(51) Int. Cl.
*H04B 7/06* (2006.01)
*H04L 5/00* (2006.01)
*H04L 25/02* (2006.01)

(52) U.S. Cl.
CPC ......... *H04B 7/0639* (2013.01); *H04B 7/0617* (2013.01); *H04L 5/0051* (2013.01); *H04L 25/0226* (2013.01)

(58) Field of Classification Search
CPC ... H04B 7/0636; H04B 7/0617; H04L 5/0051; H04L 25/0226
See application file for complete search history.

(56) References Cited

U.S. PATENT DOCUMENTS

| | | | |
|---|---|---|---|
| 10,516,514 B2 | 12/2019 | Park et al. | |
| 10,608,711 B2 | 3/2020 | Nam et al. | |
| 10,637,551 B2 | 4/2020 | Wang et al. | |
| 2013/0162476 A1* | 6/2013 | Thomas | H01Q 3/30 342/372 |
| 2015/0256239 A1* | 9/2015 | Yu | H04B 7/0632 370/329 |
| 2016/0295554 A1* | 10/2016 | Ko | H04L 25/024 |
| 2019/0190569 A1 | 6/2019 | Nayeb Nazar et al. | |
| 2020/0052842 A1* | 2/2020 | Rico Alvarino | H04B 1/713 |
| 2020/0106507 A1 | 4/2020 | Nammi et al. | |
| 2021/0273695 A1* | 9/2021 | He | H04B 7/0626 |

FOREIGN PATENT DOCUMENTS

| | | |
|---|---|---|
| CN | 109951215 A | 6/2019 |
| CN | 111279763 A | 6/2020 |

\* cited by examiner

*Primary Examiner* — Jaison Joseph
(74) *Attorney, Agent, or Firm* — Lewis Roca Rothgerber Christie LLP (57) ABSTRACT

Methods and systems of obtaining a beamforming matrix, the method comprising inputting PMI feedback from a user equipment (UE), inputting partial channel estimation derived from sounding reference signal (SRS) switching, and composing a precoding matrix using the PMI feedback and partial channel estimation.

20 Claims, 5 Drawing Sheets

TRANSMITTER BEAMFORMING AT BASE STATION WITH PARTIAL CHANNEL INFORMATION AND UE FEEDBACK

CROSS-REFERENCE TO RELATED APPLICATIONS

This application claims the benefit of U.S. Provisional Patent Application No. 63/055,507, filed Jul. 23, 2020 in the United States Patent and Trademark Office, the entire contents of which are herein incorporated by reference.

FIELD

The present disclosure is generally related to wireless communication systems. In particular, the present disclosure is related to a systems and methods for transmitter beamforming at base station with partial channel information and UE feedback.

BACKGROUND

In cellular systems (e.g., LTE and 5G NR), gNB typically decides its Tx digital beamforming precoding matrix using one of the following two methods: Uplink channel estimation from sounding reference signal (SRS) and precoding matrix indicator (PMI) feedback from UE. Since UE typically has more receive (Rx) antenna ports than transmit (Tx) antenna ports, SRS switching is introduced in new radio (NR) standard so that the UE can sweep different antenna ports during the transmission of SRS.

gNB beamforming based on uplink (UL) SRS channel estimation (CE) relies on the UE capability of SRS switching. Some UEs may only have partial capability of SRS switching, e.g., having 4 Rx antenna ports but only supporting 1T2R SRS switching. On the other hand, gNB beamforming based on UE PMI feedback is limited by the codebook design. Due to the constraint of signaling overhead, the PMI codebook has a finite size limit, which results in aggressive quantization in the beamforming vectors.

SUMMARY

According to some embodiments, a method of obtaining a beamforming matrix, the method comprising: inputting partial channel estimation derived from sounding reference signal (SRS) switching; inputting precoding matrix indicator (PMI) feedback from a user equipment (UE); and composing a beamforming matrix using the PMI feedback and partial channel estimation.

According to one embodiment, a first set of columns of the precoding matrix are obtained from the partial channel estimation and a second set of columns of the precoding matrix are obtained from the PMI feedback.

According to one embodiment, the PMI feedback is obtained by projecting a matrix indicated by the PMI feedback into a sub-space that is orthogonal to columns obtained from the partial channel estimation.

According to one embodiment, performing a singular value decomposition (SVD) for a channel matrix.

According to one embodiment, calculating a projection matrix using the precoding matrix indicator (PMI) feedback.

According to one embodiment, calculating a residual matrix using the precoding matrix indicator (PMI) feedback.

According to one embodiment, performing a singular value decomposition (SVD) for the residual matrix.

According to one embodiment, calculating a transformation matrix using of the PMI feedback.

According to one embodiment, selecting a first set of columns of a singular matrix in composing the precoding matrix.

A system for obtaining a beamforming matrix, the system comprising:
a processor; and a memory storing non-transitory processor-executable instructions that, when executed by the processor, cause the processor to: input partial channel estimation derived from sounding reference signal (SRS) switching; input precoding matrix indicator (PMI) feedback; compose a precoding matrix using the PMI feedback and partial channel estimation.

According to one embodiment, a first set of columns of the precoding matrix is obtained from the partial channel estimation and a second set of columns of the precoding matrix are obtained from the PMI feedback.

According to one embodiment, the PMI feedback is obtained by projecting a matrix indicated by the PMI feedback into a sub-space that is orthogonal to columns obtained from the partial channel estimation.

According to one embodiment, performing a singular value decomposition (SVD) for a channel matrix.

According to one embodiment, calculating a projection matrix using the precoding matrix indicator (PMI) feedback.

According to one embodiment, calculating a residual matrix using the precoding matrix indicator (PMI) feedback.

According to one embodiment, performing a singular value decomposition (SVD) for the residual matrix.

According to one embodiment, calculating a transformation matrix using of the PMI feedback.

According to one embodiment, selecting a first set of columns of a singular matrix in composing the precoding matrix.

A method of composing a final beamforming matrix, the method comprising: performing a first singular value decomposition (SVD) of a partial channel estimation matrix to obtain a first singular matrix, the partial channel estimation matrix being based on one or more uplink sounding reference signals (SRS) or one or more other reference signals; obtaining a first beamforming matrix based on precoding matrix indicator (PMI) feedback; calculating a projection of the first beamforming matrix to the first singular vector; performing, after removing the projection of the first beamforming matrix to the first singular matrix, a second SVD of a residual of the first beamforming matrix to obtain a second singular matrix; and using, a first set of columns of the first singular matrix and the second singular matrix to compose the final beamforming matrix.

A non-transitory computer-readable medium comprising instructions for deriving a beamforming matrix, wherein execution of the instructions by one or more processors causes the one or more processors to carry out the steps of: estimating a partial channel based on one or more received sounding reference signals (SRS); deriving a first beamforming matrix based on a received precoding matrix indicator (PMI) feedback; and deriving a second beamforming matrix based on the partial channel and the first beamforming matrix.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

This disclosure is directed, at least in part, to methods and systems to derive one or more gNB beamforming matrices based on UE precoding matrix indicator (PMI) feedback and SRS channel estimation with partial SRS switching. Beamforming or spatial filtering is a signal processing technique used in sensor arrays for directional signal transmission or reception. This may be achieved by combining elements in an antenna port array in such a way that signals at particular angles experience constructive interference while others experience destructive interference. Beamforming may be used at both the transmitting and receiving ends in order to achieve spatial selectivity. Precoding may be a form of beamforming to support multi-stream (or multi-layer) transmission in multi-antenna port wireless communications. In single-stream beamforming, the same signal may be emitted from each of the transmit antenna ports with appropriate weighting (phase and gain) such that the signal power is maximized at the receiver output. Precoding may allow for greater flexibility since gNB can assign different powers and phases to different antennas and also to different parts of the frequency bands (e.g., subcarriers). When the receiver has multiple antenna ports, multi-stream transmission may be used to maximize the throughput. In some embodiments of the present invention, the terms "precoding" may be used interchangeably with "beamforming" or "digital beamforming."

Figure 1:
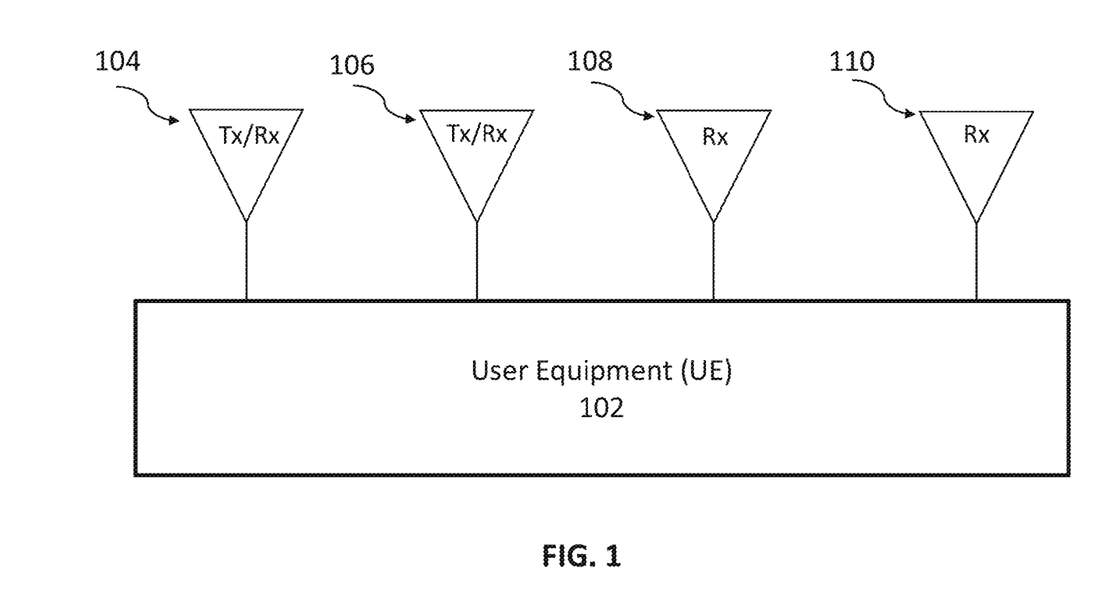
FIG. 1 illustrates a diagram of a user equipment (UE), according to some embodiments.

FIG. 1 illustrates a diagram of a user equipment (UE) 102 according to some embodiments. UE 102 may comprise one, two, three or more transmit/receive (Tx/Rx) antenna ports (e.g. 104, 106) and one, two, three or more receive (Rx) antenna ports (e.g., 108 and 110). UE 102 may comprise more or less transmit and receive antenna ports than depicted in FIG. 1. UE 102 may operate within a downlink (DL) system, with transmissions from gNB and reception at UE 102, where there are $N_T$ transmit antenna ports at gNB side and $N_R=4$ receive antenna ports at UE 102 side. In uplink, UE 102 may only be able to support 1T2R SRS switching, which means UE 102 can only transmit SRS from 1 antenna port at a time, either 104 or 106, and can sweep 2 antenna ports over time, 104 and 106. In other words, gNB can get channel estimation from 2 UE antenna ports. Other embodiments are disclosed herein, for example, 1T/1R (e.g., no dynamic switching), 1T/3R, 2T/3R, 2T/2R, 1T/4R, 2T/4R, and 3T/4R. The embodiments of this invention may be applied in all cases where gNB only obtains channel information from a portion of the total amount of UE antenna ports that will receive data.

This application discloses methods and systems of Tx beamforming or precoding schemes at the gNB side in a special case when the UE 102 has multiple receive antenna ports (e.g., Rx antenna ports 106, 108, and 110) and may perform both 1 transmit/2 receive (1T2R) sounding reference signal (SRS) switching and precoding matrix indicator (PMI) feedback. In this case, gNB may receive (1) the downlink channel estimation to 2 among 4 UE Rx antenna ports based on channel reciprocity and (2) PMI feedback, which may be a noisy, quantized and delayed version of the optimum Tx beamforming. In this disclosure, the gNB may combine the two groups of information to derive a precoding matrix.

This application discloses a heuristic solution to combine the partial channel matrix from reciprocity and PMI feedback, which may be used in the case when channel rank is not known.

Figure 2:
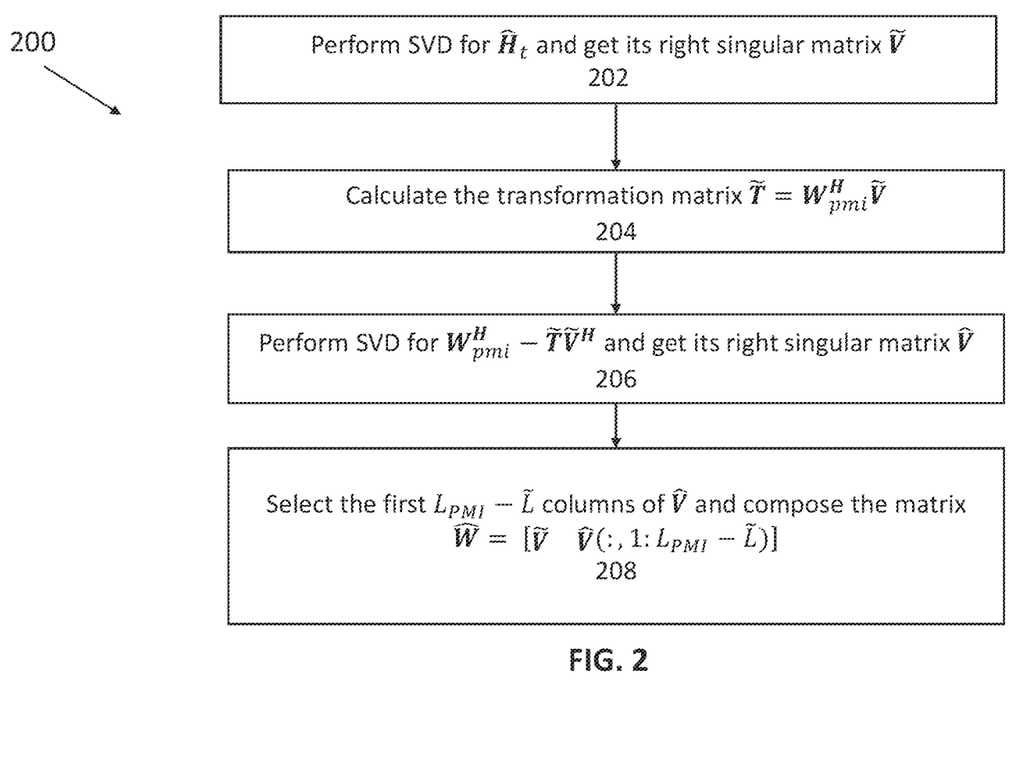
FIG. 2 illustrates a flowchart for deriving a beamforming matrix, according to some embodiments.

Turning now to FIG. 2, a flowchart 200 for composing the precoding matrix is depicted. If the downlink (DL) channel matrix is written as:

$$H = \begin{bmatrix} h_1 \\ h_2 \\ h_3 \\ h_4 \end{bmatrix} = \begin{bmatrix} H_t \\ H_b \end{bmatrix} \quad (1)$$

$$H_t = \begin{bmatrix} h_1 \\ h_2 \end{bmatrix}$$

is the top part of the channel matrix and $$H_b = \begin{bmatrix} h_3 \\ h_4 \end{bmatrix}$$

is the bottom part of the channel matrix. gNB may obtain $\hat{H}_t$ (an estimation of $H_t$), which may equal $H_t$ and $E_1$ (the channel estimation error), from 1T2R SRS switching based on Tx/Rx reciprocity, where:

$$\hat{H}_t = H_t + E_1 \quad (2)$$

One or more orthogonal frequency-division multiplexing (OFDM) channel estimation algorithms may be used to obtain the SRS channel estimation $H_t$ at gNB. gNB may also receive the PMI feedback transmitted from the UE 102, which may inform the gNB regarding the recommended precoding matrix based on the UE's 102 channel estimation and one or more codebooks at gNB. In the present disclosure, channel $H_t$ may be used interchangeably with the estimated channel $\hat{H}_t$ and vice versa.

The SVD of $H_t$ may be written as:

$$H_t = \tilde{U}\tilde{\Sigma}\tilde{V}^H \quad (3)$$

where $\tilde{U}$: $2 \times \tilde{L}$, $\Sigma$: $\tilde{L} \times \tilde{L}$, V: $N_T \times \tilde{L}$. $\tilde{L}$ is the rank of $H_t$.

The steps in flowchart 200 may be employed when the rank of channel H is unknown, but the rank of the PMI feedback is known (e.g., $\tilde{L} \leq L_{PMI} \leq L$, where L is the rank of H, $L_{PMI}$ is the rank of $W_{pmi}$, and $\tilde{L}$ is the rank of $\hat{H}_t$). The PMI feedback may relate to all of antennas 104, 106, 108, 110 such that the rank of $W_{pmi}$ is equal to or smaller than the rank of H. The precoding matrix defined by the precoding matrix indicator may be defined as $W_{pmi}$. In the 3rd Generation Partnership Project (3GPP) specifications, codebooks contain many beamforming/precoding matrices. When gNB receives PMI feedback from the UE, gNB may look up the appropriate matrices to use in communicate with the UE.

At step 202, a singular value decomposition (SVD) for $\hat{H}_t$ may be performed in order to obtain its right singular matrix $\tilde{V}$. The SVD of $\hat{H}_t$ may be obtained, accordingly: $\hat{H}_t = \tilde{U}\tilde{\Sigma}\tilde{V}^H$. In other embodiments, left singular matrices (e.g. $\tilde{U}$) may be used instead of right singular matrices. $\tilde{V}^H$, a Hermitian matrix may be derived by taking the transpose of $\tilde{V}$ then taking the complex conjugate of each entry. Therefore, once $\tilde{V}$ is known, $\tilde{V}^H$ may be derived and vice versa. This is true for all Hermitian matrices.

At step 204, the projection of $W_{pmi}$ into $\tilde{V}$ may be calculated accordingly: $W_{prj} = \tilde{V}\tilde{V}^H W_{pmi}$. Then the residual of $W_{pmi}$ may be calculated accordingly: $W_{res} = W_{pmi} - W_{prj}$.

At step 206, a SVD for $W_{res}{}^H$ may be performed accordingly: $W_{res}{}^H = \hat{U}\hat{D}\hat{V}^H$ and its right singular matrix $\hat{V}$ may be obtained. In other words, a SVD of the residual of a PMI feedback-based precoding matrix may be derived after removing its projection to $\tilde{V}$ (e.g. SVD for $W_{pmi}{}^H - \tilde{T}\tilde{V}^H$). $\hat{D}$ may be defined as a diagonal matrix. $\hat{U}$ may be defined as a left singular matrix, while $\hat{V}^H$ may be defined as the right singular matrix. In other embodiments, a SVD for $W_{res}$ may be performed, in order to obtain and use the left singular matrix $\hat{V}$, accordingly: $W_{res} = \hat{V}\hat{D}\hat{U}^H$.

At step 208, the first $L_{PMI} - \tilde{L}$ columns of V may be selected. $L_{PMI}$ may be defined as the rank of $W_{pmi}$, which is feedback by the UE using rank indicator (RI). $\tilde{L}$ may be defined as the rank of $\hat{H}_t$. The precoding/beamforming matrix $\hat{W}$ may be composed by horizontally concatenating the matrix $\tilde{V}$ and the first $L_{PMI} - \tilde{L}$ columns of $\hat{V}$ accordingly: $\hat{W} = [\tilde{V} \; \hat{V}(:,1:L_{PMI}-\tilde{L})]$, where the first ":" means all rows of $\hat{V}$ and "1 $L_{PMI}-\tilde{L}$" means from column 1 to column $L_{PMI}-\tilde{L}$ of $\hat{V}$. In this way, the precoding matrix $\hat{W}$ is a combination representing the SRS information with $\tilde{V}$ and the PMI information with $\hat{V}$. In order to horizontally concatenate two matrices, they should have the same amount of rows, which is likely the case with matrices $\tilde{V}$ and $\hat{V}$. However, the number of columns between matrices $\tilde{V}$ and $\hat{V}$ may vary. Since each matrix column may represent a UE antenna port, it is advantageous to select $L_{PMI}-\tilde{L}$ columns from $\hat{V}$ to cause the rank of the precoding/beamforming matrix $\hat{W}$ to equal that of channel H (e.g. the number of UE antenna ports). In other embodiments, the matrices $\tilde{V}$ and $\hat{V}$ may be concatenated vertically.

There are various methods to select columns from $\hat{V}$. Selecting the first $L_{PMI} - \tilde{L}$ columns is just one of the many ways. The left-side columns, right side columns, middle columns or any combination may be selected. The columns that have a large or a largest correlation with $W_{pmi}$ or the columns that most accurately describe the channel may be selected. Alternatively, the columns may be chosen randomly or based on convenience or speed of processing. In at least the case where $L_{PMI} < \tilde{L}$, the first $L_{PMI}$ columns of $\tilde{V}$ may be selected as $\tilde{V}$ may not suffer from quantization loss related to codebook constraints because one or more orthogonal frequency-division multiplexing (OFDM) channel estimation algorithms was likely used to obtain the SRS channel estimation $H_t$. This is because the, all the columns $\tilde{V}$ may be selected as $\hat{V}$ may contain more complete channel information in spite of possible noise and distortion caused by quantization. Any another combination of the columns of $\tilde{V}$ and $\hat{V}$ may be selected as the final beamforming matrix. These systems and methods are helpful in situations where $L_{PMI} < \tilde{L}$ because the UE or one or more UE antenna ports has not received CSI-RS from gNB, is malfunctioning, is down for maintenance, is experiencing interference or noise, and/or is not providing complete PMI feedback for any other reason.

This method could also be used in other systems such as Long Term Evolution (LTE), where the base station can obtain both partial channel information and the precoding matrix from UE feedback to derive the final beamforming matrix.

Figure 3:
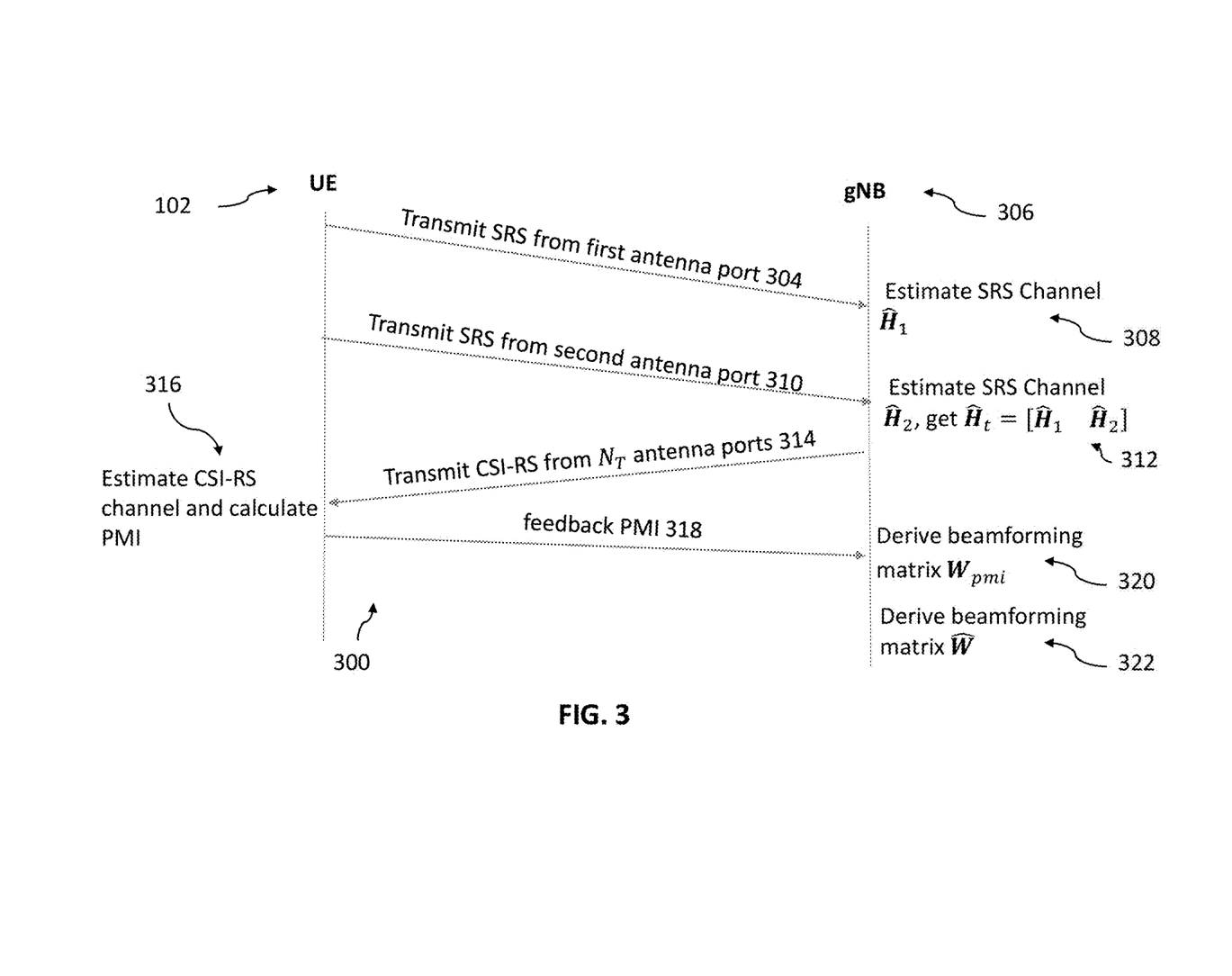
FIG. 3 illustrates a diagram for composing a precoding matrix, according to some embodiments.

Turning now to FIG. 3, an illustration 300 is shown of how the UE 102 and gNB 306 may communicate with each other to derive the final beamforming matrix. The UE 102 may transmit SRS 304 (e.g. relating to antenna port 104) from the first antenna port 104 to the gNB 306. The gNB 306 may then estimate the SRS channel $\hat{H}_1$ 308. Then, the UE 102 may transmit the SRS 310 (e.g. relating to antenna port 106) from the second antenna port 106 to the gNB 306, where the gNB 306 estimates the SRS channel $\hat{H}_2$ to obtain $\hat{H}_t = [\hat{H}_1 \ \hat{H}_2]$ 312. The gNB 306 may transmit CSI-RS from all or some gNB $N_T$ antenna ports 314 to all receive antenna ports of the UE 102, where the UE 102 may estimate the CSI-RS channel and calculate PMI 316. UE 102 may then transmit feedback PMI 318 to the gNB 306, where the gNB 306 may utilize the feedback PMI 318 to derive the precoding matrix $W_{pmi}$ 320. Then gNB 306 may derive beamforming matrix $W$ 322 according any of the methods and/or systems disclosed in this application.

Figure 4:
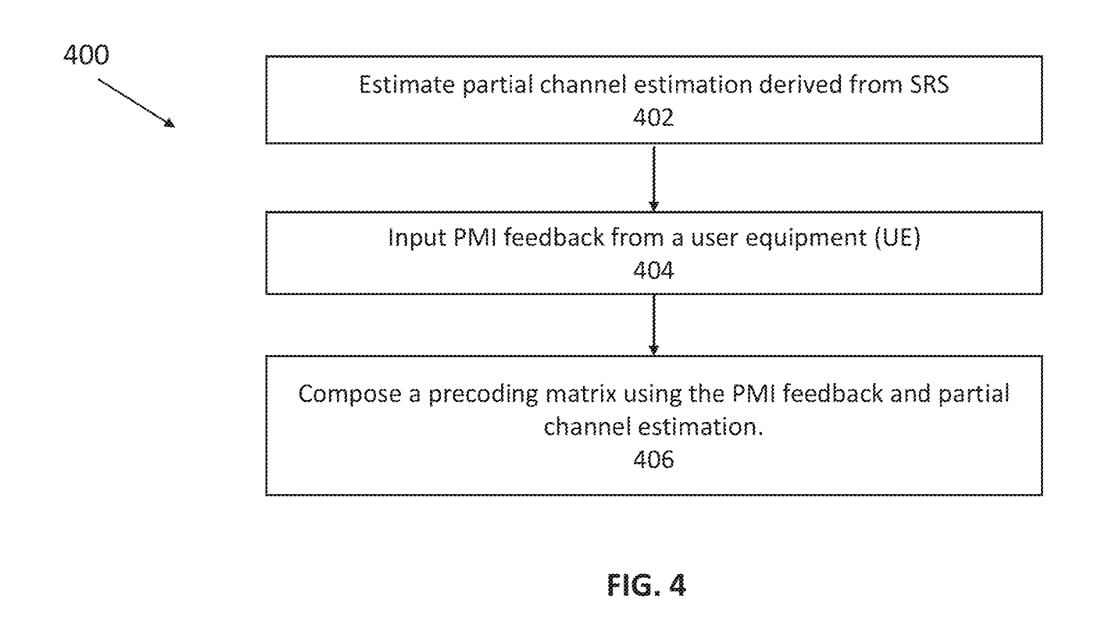
FIG. 4 illustrates a flowchart for composing a precoding matrix, according to some embodiments.

Turning now to FIG. 4, a flowchart 400 for composing a precoding matrix is depicted. At step 402, a partial channel estimation may be estimated from SRS information, for example, at gNB 306. The partial channel may comprise a top, bottom, middle portion or any other group of a channel.

At step 404, PMI feedback from a user equipment (UE) is input, for example, at gNB 306. This PMI feedback may be used by gNB 306 to produce a PMI precoding matrix based on one or more codebooks.

At step 406, using the PMI feedback and partial channel estimation, a precoding matrix may be composed, for example, at gNB 306. The precoding matrix may be used to more efficiently send transmissions from gNB 306 to UE 102. The steps in this flowchart may be used in conjunction with any of the methods and steps disclosed in the application.

Figure 5:
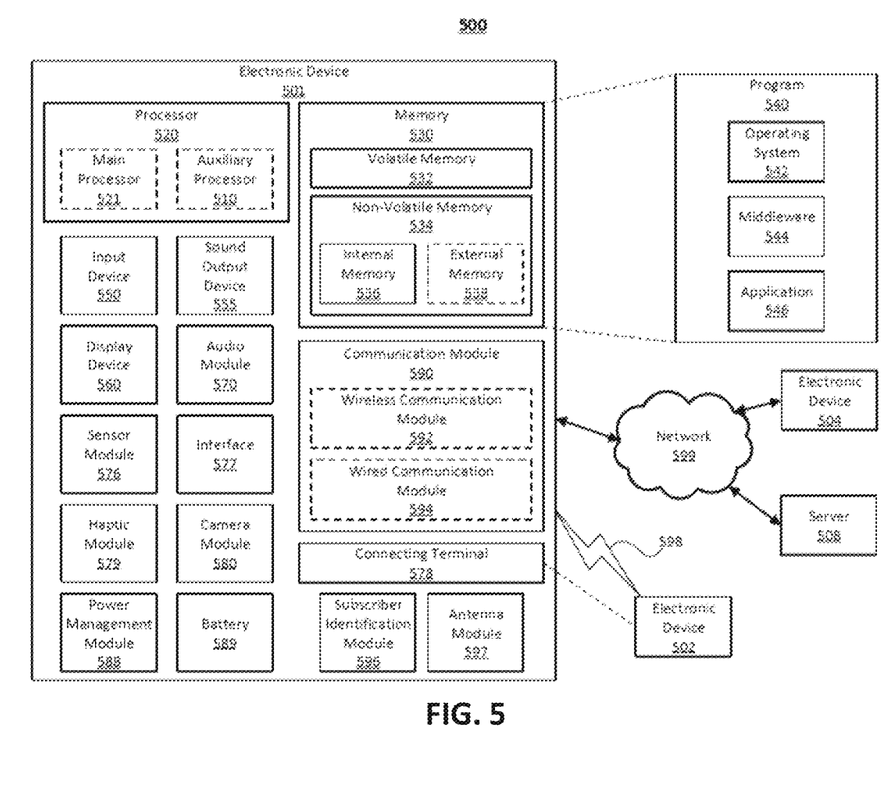
FIG. 5 illustrates a block diagram of an electronic device in a network environment, according to one embodiment.

FIG. 5 illustrates a block diagram of an electronic device 501 in a network environment 500, according to one embodiment. Referring to FIG. 5, the electronic device 501 in the network environment 500 may communicate with another electronic device 502 via a first network 598 (e.g., a short-range wireless communication network), or another electronic device 504 or a server 508 via a second network 599 (e.g., a long-range wireless communication network). The electronic device 501 may also communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In one embodiment, at least one (e.g., the display device 560 or the camera module 580) of the components may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute, for example, software (e.g., a program 540) to control at least one other component (e.g., a hardware or a software component) of the electronic device 501 coupled with the processor 520, and may perform various data processing or computations. As at least part of the data processing or computations, the processor 520 may load a command or data received from another component (e.g., the sensor module 576 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 510 (e.g., a graphics processing unit (GPU), an image signal processor (ISP), a sensor hub processor, or a communication processor (CP)) that may be operable independently from, or in conjunction with, the main processor 521. Additionally or alternatively, the auxiliary processor 510 may be adapted to consume less power than the main processor 521, or execute a particular function. The auxiliary processor 510 may be implemented as being separate from, or a part of, the main processor 521.

The auxiliary processor 510 may control at least some of the functions or states related to at least one component (e.g., the display device 560, the sensor module 576, or the communication module 590) among the components of the electronic device 501, instead of the main processor 521 while the main processor 521 may be in an inactive (e.g., sleep) state, or together with the main processor 521 while the main processor 521 may be in an active state (e.g., executing an application). According to one embodiment, the auxiliary processor 510 (e.g., an image signal processor or a communication processor) may be implemented as part of another component (e.g., the camera module 580 or the communication module 590) functionally related to the auxiliary processor 510.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. According to one embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. According to one embodiment, the haptic module 579 may include, for example, a motor, a piezoelectric element, or an electrical stimulator.

The camera module 580 may capture a still image or moving images. According to one embodiment, the camera module 580 may include one or more lenses, image sensors, image signal processors, or flashes.

The power management module 588 may manage power supplied to the electronic device 501. The power management module 588 may be implemented as at least part of, for example, a power management integrated circuit (PMIC).

The battery 589 may supply power to at least one component of the electronic device 501. According to one embodiment, the battery 589 may include, for example, a primary cell which may be not rechargeable, a secondary cell which may be rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the AP) and supports a direct (e.g., wired) communication or a wireless communication. According to one embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to one embodiment, the antenna module 597 may include one or more antenna ports, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or server 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

One embodiment may be implemented as software (e.g., the program 540) including one or more instructions that are stored in a storage medium (e.g., internal memory 536 or external memory 538) that may be readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium may be a tangible device, and does not include a signal (e.g., an electromagnetic wave), but this term does not differentiate between where data may be semi-permanently stored in the storage medium and where the data may be temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of obtaining a beamforming matrix, the method comprising:
    inputting partial channel estimation derived from sounding reference signal (SRS) switching;
    inputting precoding matrix indicator (PMI) feedback from a user equipment (UE); and
    composing a beamforming matrix using the PMI feedback and partial channel estimation.

2. The method of claim 1, wherein a first set of columns of the precoding matrix is obtained from the partial channel estimation and a second set of columns of the precoding matrix are obtained from the PMI feedback.

3. The method of claim 1, wherein the PMI feedback is obtained by projecting a matrix indicated by the PMI feedback into a sub-space that is orthogonal to columns obtained from the partial channel estimation.

4. The method of claim 1, comprising performing a singular value decomposition (SVD) for a channel matrix.

5. The method of claim 1, comprising calculating a projection matrix using the PMI feedback.

6. The method of claim 1, comprising calculating a residual matrix using the PMI feedback.

7. The method of claim 6, comprising performing a singular value decomposition (SVD) for the residual matrix.

8. The method of claim 1, comprising calculating a transformation matrix using of the PMI feedback.

9. The method of claim 1, comprising selecting a first set of columns of a singular matrix in composing the precoding matrix.

10. A system for obtaining a beamforming matrix, the system comprising:
    a processor; and
    a memory storing non-transitory processor-executable instructions that, when executed by the processor, cause the processor to:
    input partial channel estimation derived from sounding reference signal (SRS) switching;
    input precoding matrix indicator (PMI) feedback;
    compose a precoding matrix using the PMI feedback and partial channel estimation.

11. The system of claim 10, wherein a first set of columns of the precoding matrix are obtained from the partial channel estimation and a second set of columns of the precoding matrix are obtained from the PMI feedback.

12. The system of claim 10, wherein the PMI feedback is obtained by projecting a matrix indicated by the PMI feedback into a sub-space that is orthogonal to columns obtained from the partial channel estimation.

13. The system of claim 10, comprising performing a singular value decomposition (SVD) for a channel matrix.

14. The system of claim 10, comprising calculating a projection matrix using the PMI feedback.

15. The system of claim 10, comprising calculating a residual matrix using the PMI feedback.

16. The system claim 15, comprising performing a singular value decomposition (SVD) for the residual matrix.

17. The system of claim 10, comprising calculating a transformation matrix using of the PMI feedback.

18. The system of claim 10, comprising selecting a first set of columns of a singular matrix in composing the precoding matrix.

19. A method of composing a final beamforming matrix, the method comprising:
    performing a first singular value decomposition (SVD) of a partial channel estimation matrix to obtain a first singular matrix, the partial channel estimation matrix being based on one or more uplink sounding reference signals (SRS) or one or more other reference signals;
    obtaining a first beamforming matrix based on precoding matrix indicator (PMI) feedback;
    calculating a projection of the first beamforming matrix to the first singular matrix;
    performing, after removing the projection of the first beamforming matrix to the first singular matrix, a second SVD of a residual of the first beamforming matrix to obtain a second singular matrix; and
    using, the first singular matrix and a first set of columns of the second singular matrix to compose the final beamforming matrix.

20. A non-transitory computer-readable medium comprising instructions for deriving a beamforming matrix, wherein execution of the instructions by one or more processors causes the one or more processors to carry out the steps of:
    estimating a partial channel based on one or more received sounding reference signals (SRS);
    deriving a first beamforming matrix based on a received precoding matrix indicator (PMI) feedback; and
    deriving a second beamforming matrix based on the partial channel and the first beamforming matrix.

* * * * *